Figure 1:
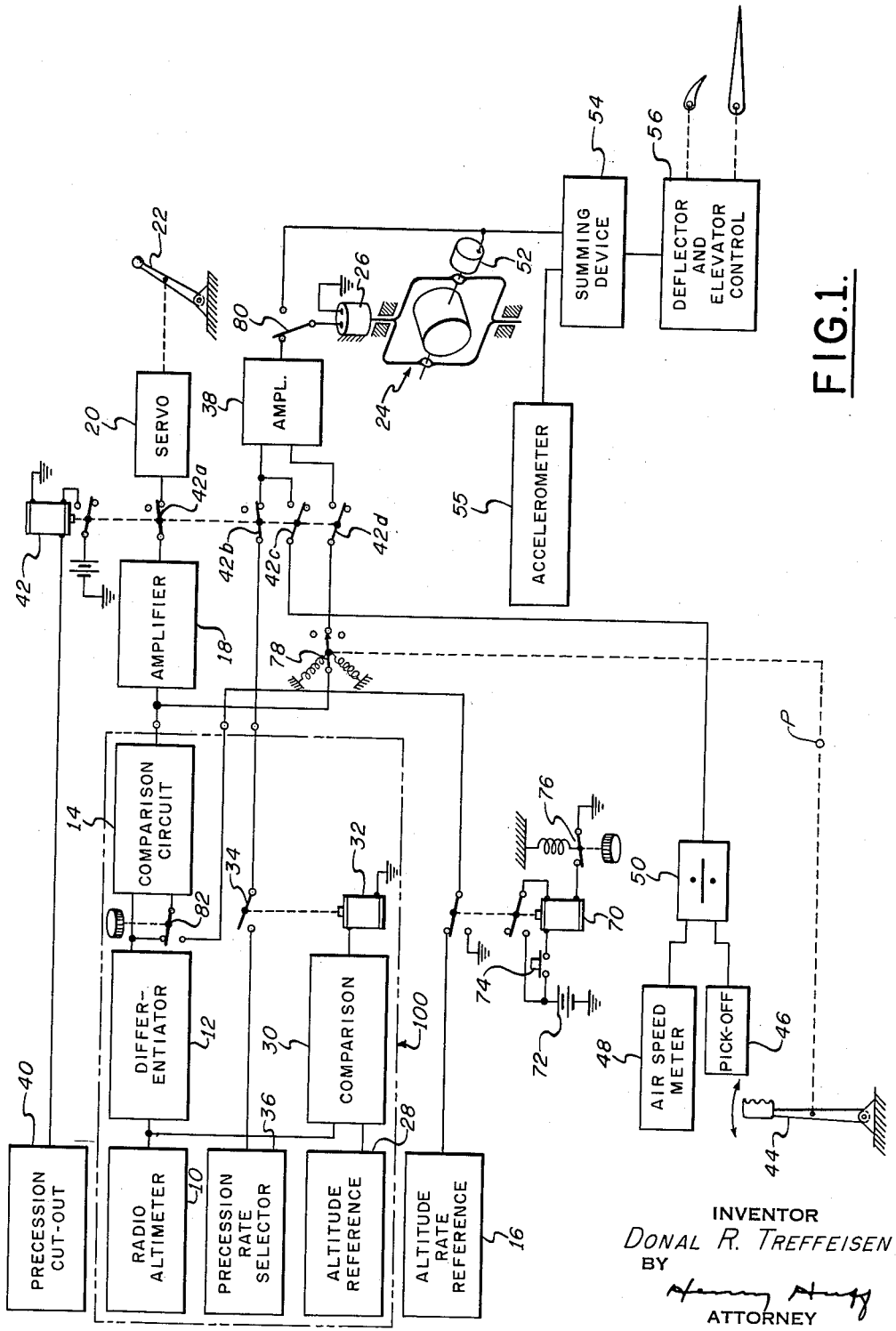

May 14, 1963 D. R. TREFFEISEN 3,089,671
FLIGHT CONTROL SYSTEMS
Filed Sept. 23, 1960 2 Sheets-Sheet 1

INVENTOR
DONAL R. TREFFEISEN
BY
ATTORNEY

May 14, 1963  D. R. TREFFEISEN  3,089,671
FLIGHT CONTROL SYSTEMS
Filed Sept. 23, 1960  2 Sheets-Sheet 2

INVENTOR
DONAL R. TREFFEISEN
BY
ATTORNEY

3,089,671
Patented May 14, 1963

3,089,671
FLIGHT CONTROL SYSTEMS
Donal R. Treffeisen, Huntington Station, N.Y., assignor to Sperry Rand Corporation, Great Neck, N.Y., a corporation of Delaware
Filed Sept. 23, 1960, Ser. No. 57,990
17 Claims. (Cl. 244—77)

This invention relates generally to flight control systems and more particularly to apparatus for controlling the pitch attitude of a vertical take-off and landing, i.e. VTOL, aircraft of the type which takes off and lands with its longitudinal axis perpendicular to the earth.

In flying a VTOL aircraft during take-offs and landings, difficulties not present with conventional aircraft arise because the pilot cannot control the attitude and lift of his craft by means of familiar control surfaces. Instead, the pilot must vary the direction and magnitude of the craft thrust if he wishes to change the craft attitude and lift. This may be accomplished by rotation of the craft axis in space or by specific rotation of the thrust vector with the aircraft longitudinal axis horizontal. Thrust deflecting techniques presently employed by VTOL aircraft include: pivotally mounted engines; vanes which are insertable into the exhaust stream of the craft engine; and auxiliary engines, different combinations of which effect different directions of resultant thrust. Vertical take-offs and landings are especially difficult for the pilot to perform when the craft flown is of the tailsitting type, i.e. the type which takes off and lands with the craft longitudinal axis perpendicular to the ground. This is because visual and kinesthetic cues as to craft position and the movement relative to the ground are not afforded the pilot since the pilot is in a rearward leaning position during both take-off and landing. The pilot must therefore rely on his instruments and attitude and position information which is relayed from the ground.

A pilot flying a tailsitting VTOL aircraft effects a take-off maneuver by advancing the craft throttle until the craft thrust-to-weight ratio exceeds one. When this ratio is in excess of one, there is a resultant upward force on the craft which causes the craft to accelerate upward until a constant rate of climb (as determined by the throttle position) is reached when aerodynamic drag becomes equal to excesses of thrust overweight. As the craft moves skyward and its speed increases, aerodynamic lift is experienced by the craft which causes the craft to nose-back and depart from a pure vertical ascent. The pilot must therefore return the craft to the vertical by advancing the craft control stick. Movement of the control stick actuates both the craft control surfaces and the craft thrust deflector, the effects of which are combined to enable the craft to continue the pure vertical ascent. This is a continuous operation for the pilot, with the combination of thrust deflection and aerodynamic lift in a constant state of change as the craft air speed increases. The combination of thrust deflection and lift must also be varied when winds cause the craft ascent to be other than vertical. At a predetermined altitude, the pilot, if his speed is such that aerodynamic lift together with the thrust of the craft will support the craft, noses the craft over and proceeds to fly the craft as a conventional airplane. It is highly desirable for the pilot to complete the nose-over operation as soon as possible after take-off so that efficient and natural operation of the craft may be attained. The use of engine thrust as the sole support of the craft is very expensive in terms of fuel burned. Also, since flying is an operation which largely relies on the senses of the pilot, it is necessary to go very quickly to a mode of operation which "feels" natural and conventional to the pilot, i.e. flight control by means of the craft control surfaces. However, the rate of change from one operation mode to another must not be so great as to be uncomfortable to the pilot. That is, the "g's" experienced by the pilot during the nosing-over should be substantially low and constant so that the pilot will be at his maximum efficiency. The change in mode of operation must not be made until the air speed is sufficient to provide enough aerodynamic lift to support the weight of the craft in level flight.

Generally, apparatus embodying the present invention takes the pitch control of a VTOL tailsitter type aircraft during take-off out of the hands of the pilot by automatically blending thrust and aerodynamic control to effect a vertical rise and by providing a craft nosing over operation which rapidly produces normal "feel" and, yet, which is not uncomfortable to the pilot. Apparatus employing the invention provides VTOL tailsitter aircraft with take-off control by commanding a constant rate of climb through the craft engine control system and by providing a reference, i.e. the spin axis of a 2 degree of freedom gyro, to which the longitudinal axis of the craft is slaved. The reference is maintained vertical to the earth below a predetermined altitude, but above that altitude the reference is precessed to a substantially horizontal relationship with the earth. The altitude selected is chosen so that sufficient speed will have been developed to permit level flight by lift alone. Then the precession of the reference is stopped. To bring the longitudinal axis of the craft into alignment with the reference, both the craft thrust deflectors and control surfaces are moved, with their respective effects on the craft attitude being additive. By maintaining a constant precession rate, the comfort of the pilot (during nose-over) is assured. However, by maintaining a constant climb rate in conjunction with this constant precession rate, a very rapid yet safe change from attitude control by thrust deflectors to pitch attitude control by elevators will be effected. This is because the craft air speed will increase exponentially as the craft noses over in order to keep the rate of climb constant. After the craft noses over, the take-off control is disabled and normal flight, i.e. flight in which control is solely by means of the craft control surfaces, is maintained. The disabling is transientless because the take-off control system had been commanding rates of change. In normal flight, good control over the flight path of the craft is achieved by precessing the reference in response to only control stick input commands and using the reference to derive both long and short term elevator control signals. The long term elevator control signals represent the angular displacement between the reference and the craft longitudinal axis as caused by a force on the control stick. The short term elevator control signals, however, represent the angular displacement between the reference and the craft longitudinal axis as caused by wind gusts, sudden air density changes and the like. An elevator control signal, representing the angular displacement between the reference and the craft longitudinal axis, is thereby produced and represents a long term elevator control signal. This signal is cancelled by varying the craft control surfaces so as to bring the craft longitudinal axis into alignment with the reference. With the craft flying along the path commanded by the reference, momentary departures from that path which are not commanded by the pilot, immediately produce short term elevator control signals. These signals likewise, vary the craft control surfaces to align the craft longitudinal axis with the reference. Since the short term elevator control signals are produced and automatically operate the craft elevators irrespective of the control stick position, the pilot is unaware of their cause, generation, and effect. Hence, apparatus embodying the invention enables the craft to be flown under semi-automatic control with the pilot introducing all long term commands manually and the system removing all short term disturbances automatically.

A principal object of the invention is to provide automatic take-off control apparatus for a VTOL aircraft of the type which takes off and lands with its longitudinal axis perpendicular to the earth.

Another object of the invention is to provide pitch control apparatus for a VTOL aircraft of the type which takes off and lands with its longitudinal axis perpendicular to the earth.

Another object of the invention is to provide apparatus which permits a VTOL tailsitting type aircraft to complete the nose-over operation smoothly and rapidly.

Another object of the invention is to provide take-off control apparatus for a VTOL tailsitter aircraft which prevents the nose-over operation from being commenced until the craft reaches a predetermined air speed.

Another object of the invention is to provide flight control apparatus for VTOL type aircraft which varies the control of the craft by thrust deflectors as a function of the air speed of the craft.

Figure 2:
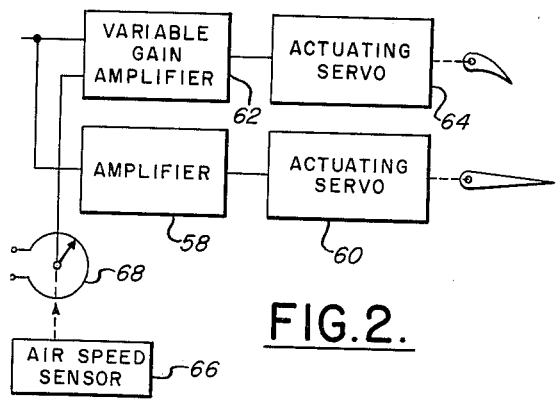
Figure 3:
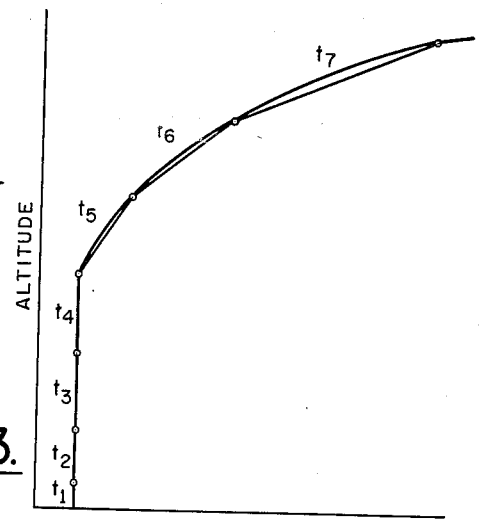
Figure 4:
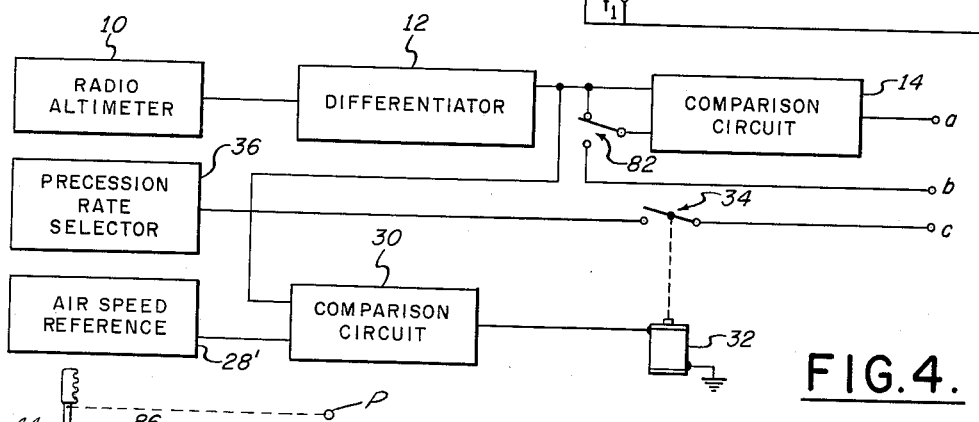
Figures 5, 6:
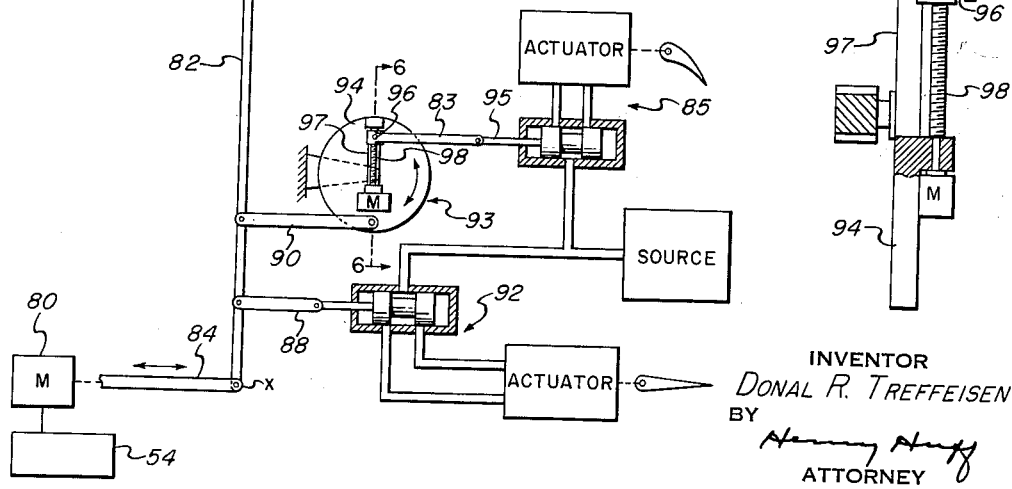

The invention will be described with reference to the figures, wherein:

FIG. 1 is a block diagram of apparatus embodying the invention,

FIG. 2 is a block diagram of a thrust deflector and elevator control usable with the invention, FIG. 3 is a diagram showing a typical take-off maneuver for a VTOL tailsitter aircraft employing the invention, FIG. 4 is a block diagram of a circuit which, when substituted for a circuit in FIG. 1, provides another embodiment of the invention, FIG. 5 is a schematic diagram of a presently preferred elevator and thrust deflector control, and FIG. 6 is a view of a section of FIG. 5 taken along line 6—6.

Referring to FIGS. 1 and 2, a radio altimeter 10 produces a signal proportional to the instantaneous altitude of the craft. This signal is applied to a differentiator 12 which produces a signal proportional to the instantaneous rate of climb of the craft, the craft climb rate signal then being applied to a comparison circuit 14. A signal produced by an altitude rate reference 16 and representing a reference rate of climb, is also applied through switching (the purpose of which will be described later) to the comparison circuit 14. The altitude rate reference may be a simple potentiometer which is preset at the discretion of the pilot or which may be fixed at a value depending on the design of the craft. The comparison circuit 14 operates to produce an error signal proportional to the difference between its input signals. The error signal is then amplified by an amplifier 18 and applied through switching (which will also be described later) to a servo 20. The servo 20 is connected to the craft throttle 22 and operates the throttle in accordance with its input signals.

A gyroscope 24, the spin axis of which is precessable by torquers, establishes a reference for the craft longitudinal axis. For clarity, only one torquer 26 is shown in FIG. 1 since the present invention is concerned with only the pitch attitude of the craft. The torquer 26, in response to input signals applied to it, applies a torque which tries to rotate the gyro spin axis about an axis parallel to the yaw axis but which, in accordance with well-known gyroscope principles, precesses the spin axis about an axis parallel to the craft pitch axis. An altitude reference 28 provides a signal having a sense opposite to that of the altimeter 10 output signal and which represents the transition altitude, i.e. the altitude at which the nosing over operation is to be commenced. The altitude reference may be a simple potentiometer which is preset either by the pilot or in accordance with the design of the craft. The altitude reference signal is applied to a comparison circuit 30 together with a signal from the altimeter 10. The comparison circuit 30 produces an output signal proportional to the difference between its input signals which is applied to a polarized relay 32. At the transition altitude, the direction of energization of the relay 32 is reversed, thereby closing a switch 34. When the switch 34 closes, the output signal from a precession rate selector 36 is applied, through an amplifier 38, to the torquer 26. The application of a signal to the torquer precesses the reference at a rate proportional to the magnitude of the applied signals. The precession rate selector likewise may be a simple potentiometer by which the pilot may predetermine the magnitude of the precession signals and, therefore, the rate at which the reference precesses. A precession cutout 40, which produces an output signal whenever the craft is in near-level flight, applies its output signal to a self-holding relay 42 which disables the take-off control. The precession cutout may be, for example, either a simple pendulum or a pickoff on the craft horizon indicator that closes the relay 42 circuit whenever the craft is in near-level flight. A typical near-level flight would be one in which the craft has a 5 degree nose-high attitude with respect to the horizon. The take-off control is disabled when the craft is in near-level flight (before the craft reaches level flight) to assure that the reference has not precessed through more than 90 degrees, thereby commanding a downward flight path. That is, in accord with servo theory, the craft motion in general lags behind that of the reference by a small angle proportional to the rate of change of the reference angle. After the relay 42 is energized, the switch contacts 42a, 42b, 42c and 42d are all held in their upper positions. This disables the throttle servo 20 and removes the application of precession signals, produced by the precession rate selector, from the torquer 26. However, precession signals are derived from the craft control stick 44 and are applied to the torquer 26 when the switch 42c is moved to its upper position. In conventional pitch control systems, i.e. systems in which the control stick directly controls the deflection of the elevators, the amount that the control stick must be deflected to effect a given pitch rate varies inversely with the speed of the craft. In apparatus embodying the present invention, the reference is directed, i.e. flown, to a desired attitude and the craft, as will be later described, follows up on this attitude. Hence, for naturalness of feel, it is important to have the reference "fly" in response to control stick commands exactly the way an airplane would fly. A control stick pick-off 46, responsive to the application of force to the control stick 44, produces a signal proportional to that force. This signal and a signal derived from the craft air speed meter 48 are applied to a divider circuit 50 which produces a signal proportional to the ratio of the control stick force to the air speed of the craft. A limit on the air speed signal is provided to prevent division by zero during hover. The divider 50 output signal is then applied through the switch 42c to the torquer 26 to precess the reference as though the reference were the craft itself.

When there is an angular displacement between the reference and the craft longitudinal axis, e.g. when the reference is being precessed away from the craft longitudinal axis, a pick-off 52 responds to produce a signal proportional to such displacement. The pick-off 52 output signal is algebraically summed in a summing device 54 with a signal which is proportional to the angular acceleration of the craft about the pitch axis. This last-mentioned signal is produced by an accelerometer 55 and serves not only to damp the response of the craft to the displacement signal but to anticipate short term departures of the craft from the flight path defined by the reference. The output signal from the summing device 54 is applied to a thrust deflector and elevator control 56 which is shown in detail in FIG. 2. The thrust deflector and elevator control 56 has two channels, one for the control of the craft elevators and one for the control of the craft thrust deflector. The elevator control channel comprises an amplifier 58 and a servo 60 which responds to the output signals from the amplifier 58 to operate the elevators. The thrust deflector channel comprises a variable gain amplifier 62 and a servo 64 which operates to vary the direction of the craft thrust in accordance with the amplifier 62 output signals. An air speed sensor 66 connects to and drives the wiper of a potentiometer 68 in proportion to the air speed of the craft. The potentiometer 68 output signal is applied to the variable gain amplifier 62 and operates to bias the amplifier 62 so that, as the craft speed increases, the output of the amplifier 62, and therefore the effect of the thrust deflector channel, is gradually reduced to zero. This reduction of the effect of the deflector channel is desirable for naturalness of "feel" and for efficiency of operation as described earlier.

A hover and altitude hold relay 70 operates to apply either a signal from the altitude rate reference 16 or a signal representing a zero climb rate to the comparison circuit 14. A zero climb rate during hovering is effected through the throttle control and the craft attitude is controlled solely by the craft thrust deflectors. A zero climb rate during altitude hold in the normal mode of flight is effected solely by the craft elevators. The relay 70, which is a self-holding relay, is connected to a potential source 72 through a switch 74. The switch 74 is a push button type switch which makes and breaks a circuit when respectively pushed and released. A relay release switch 76, which is normally held closed, is connected in series with the relay 70 and, when opened, deenergizes the relay 70.

A normally closed spring loaded switch 78 is connected in series between the comparison circuit 14 and the amplifier 38. The switch 78 is connected directly to the control stick 44 and, when a force is applied to the stick, the switch 78 is opened against the spring loading. When the craft is in an altitude hold mode of operation, application of a force to the control stick removes the application of altitude hold signals, derived from the comparison circuit 14, from the amplifier 38 and applies only the divider 50 output signals to the amplifier 38. However, removal of the control stick force reapplies the altitude control signals to the amplifier 38. Thus, the craft will always hold the altitude at which the control stick 44 is released if the craft is flown in the altitude hold mode of operation. Altitude hold by elevator control is possible only in horizontal attitudes where air speed is sufficient to produce lift equal weight.

Prior to take-off, a switch 80 connects the reference pick-off 52 to the torquer 26 to slave the reference to the longitudinal axis of the craft which, when the craft is on the ground, is perpendicular to the earth. When, however, it is desired to take-off, the switch 80 is operated to connect the amplifier 38 to the torquer and thereby slave the longitudinal axis of the craft to the reference. Also prior to take-off, a switch 82 is held in its upper position. When the switch 82 is in its upper position, the comparison circuit can have no output signal, and hence no rate of climb can be commanded. When the pilot wishes to take-off, he moves the switch 82 to its lower position. At the instant the switch 82 moves to its lower position, the comparison circuit 14 has an actual rate of climb signal and a commanded rate of climb signal applied to it. The comparison circuit 14 therefore produces an error signal which, when applied to the servo 20, causes the throttle to be advanced at a rate proportional to the error signal. The craft then begins to climb. As the craft climbs, its rate of climb gradually approaches the commanded rate of climb, and, therefore, the throttle is gradually backed off. As the craft ascends (and its lift increases) departures of the craft from the vertical defined by the references are sensed by the pick-off 52 and cancelled by the operation of the thrust deflector and elevators as earlier described.

At the transition altitude, the switch 34 is closed (in response to a reversal in the direction of energization of the relay 32) thereby applying a voltage to the torquer 26 which precesses the reference. The thrust deflector and elevators of the craft then operate to cause the craft to follow up on the precessing reference. As the craft follows up on the reference its speed must be increased to maintain the rate of climb constant. Therefore, the throttle is advanced more and more as the craft noses over and approaches level flight. This operation causes the craft air speed to rise exponentially during the transition thereby effecting a rapid, yet smooth, change to elevator control. See FIG. 3. After the reference has precessed through 85 degrees, the precession is stopped by the energization of the relay 42, and the directing of the reference is made solely by the pilot through the application of control stick forces. This type of take-off which results in a high speed climb out from the take-off site is typical of tactical fighter requirements and is also the safest and quietest for neighboring installations and ground personnel.

If, during the ascent, the pilot wishes to hover, he pushes the button of the switch 74 which disconnects the altitude rate references 16 from the comparison circuit 14 and connects, instead, such comparison circuit 14 input to ground. This causes the throttle 22 to back off until a zero climb rate is effected. Attitude control during hovering is effected by the thrust deflector which responds to pick-off 52 output signals. The take-off is resumed by momentarily opening the switch 76.

With the take-off operation completed and the pilot alone controlling the direction of the reference by means of his control stick, the craft may be made to hold its present altitude by pushing the button of the switch 74 to energize the relay 70. The relay 70, when energized, once again applies a zero climb rate signal to the comparison circuit 14. The comparison circuit 14 during altitude hold, however, applies its output error signal to the torquer 26 which precesses the reference. The craft elevators are then operated to maintain the altitude constant. If the pilot wishes to ascend or descend to a new altitude, a force is applied to the control stick, opening the switch 78 and applying, instead of the altitude hold signals, the signals which are derived from the control stick to the torquer 26. Upon release of the control stick, the switch 78 is closed and altitude hold is resumed at the altitude at which the stick was disengaged.

By substituting the circuit shown in FIG. 4 for the circuit 100 of FIG. 1, a different embodiment of the invention may be obtained. This embodiment commences the nosing-over operation after a predetermined air speed is reached, and, hence, may be preferred for safety reasons. That is, the predetermined air speed so selected may be one at which aerodynamic lift alone will support the craft in the air. The only difference between the circuit 100 and the circuit of FIG. 4 is that the signal from the differentiator 12 is applied to the comparison circuit 30 instead of the signal from the altimeter 10, and an air speed reference 28' is substituted for the altitude reference 28. The air speed reference may be a simple potentiometer which produces an output signal having a sense opposite to that of the differentiator output signal. Operation of this embodiment is identical to the operation of FIG. 1, with the one exception that the reference is precessed after a predetermined air speed is reached instead of after reaching a predetermined altitude.

Referring to FIGS. 5 and 6, a presently preferred deflector and elevator control is shown, such preferred control being adapted to be connected to the summing device 54 and the control stick 44 of FIG. 1 and thereby replace the control 56. In FIG. 5, a motor 80 receives the output signal from the summing device 54 and converts that signal into its mechanical equivalent. The motor 80 is mechanically linked to the lever 82 at point $x$ by a rod 84 which is moved by the motor 80 in the directions shown. The control stick 44 is connected to the other end of the lever 82 at a point $y$ by a rod 86. Both rods 84 and 86 are pivotally connected to the lever 82. Rods 88 and 90 are also pivotally connected to the lever 82 and are preferably connected nearer the end to which the rod 84 is connected. The rod 88 is connected to and operates the valve of a hydraulic or pneumatic servo 92 associated with the craft ailerons when the summing device 54 has an output signal. The rod 90 is likewise connected, through a variable gain device 93, to the valve of a hydraulic or pneumatic servo 85 associated with the craft thrust deflector. The variable gain device 93 comprises a disk 94 which is rotatable about its center and to which the rod 90 is pivotally connected. The rod 90 is connected near the circumference of the disk. A shaft 95 is connected to a slotted member 83 having a pin 96 positionable therein. The pin 96 is movable in a slot 97 in the disk 94 by the action of a lead screw 98 which drives the pin 96 closes to the center of the disk 94 in proportion to the output signals from the craft air speed sensor 66 (not shown in FIG. 5).

Use of the apparatus of FIGS. 5 and 6 for elevator and thrust deflection control is presently preferred because it enables the craft to be primarily flown by "flying the reference," yet permits the craft to be flown directly by the control stick in the event of system failure. With the rod 84 immovable because of system failure, application of a force, to the control stick 44 will cause the lever to pivot about the point $x$ and thereby cause the elevator and thrust deflecting servos to be activated. With, however, the system operative, a force applied to the control stick will cause the rods 84 and 86 to move and accordingly operate the servos 92 and 94. With no force applied to the control stick and a short term signal applied to the motor 80, the lever is pivoted about the point $y$. The servos are then operated as before to cancel this signal.

As the craft air speed increases, the pin 96 is moved closer to the center of the disk 94. Hence, at the air speed at which the pin is at the disk center, movement of the rod 90 will produce no movement of the shaft 95. Therefore, at this speed, the thrust deflector servo 94 is rendered ineffective and control of the craft is solely by means of the elevator.

Another embodiment of the device of FIG. 5 provides that the pin 96 be spring loaded against the force applied to the control stick. This is so that, in the event the elevator control system fails, the pin will be released to the circumference of the disk 94 by the application of a large force to the stick. Thus, emergency control of the craft may be made through the operation of the craft thrust deflector.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. Apparatus for controlling the pitch attitude of a vertical take-off and landing aircraft during take-off, said craft being of the type which takes off and lands with its longitudinal axis substantially perpendicular to the earth comprising means providing the craft with a substantially constant rate of climb, means providing signals representing a commanded craft pitch rate that is substantially zero and a commanded craft pitch rate that is greater than zero, and servo means responsive below a predetermined altitude to said zero pitch rate signals and responsive above said predetermined altitude to said other pitch rate signals, said servo means operating to deflect the craft elevators and vary the direction of the craft thrust to effect the craft pitch rate then being commanded.

2. Apparatus for controlling the pitch of a vertical take-off and landing aircraft during take-off, said craft being of the type which takes off and lands with its longitudinal axis substantially perpendicular to the earth, comprising means maintaining the craft rate of climb substantially constant, means producing a signal representing a commanded craft pitch rate that is substantially zero, means producing a signal representing a commanded craft pitch rate that is greater than zero, servo means connected to the craft elevator and thrust deflector to vary the craft pitch in accordance with the servo input signals, and means responsive below a predetermined altitude to connect said zero pitch rate signals to said servo means and responsive above said predetermined altitude to connect said other pitch rate signals to said servo means.

3. Apparatus for controlling the pitch of a vertical take-off and landing aircraft during the take-off maneuver, said craft being of the type which takes off and lands in substantially perpendicular relationship with the earth, comprising means providing said craft with a substantially constant rate of climb, means producing a signal representing a commanded craft pitch rate that is substantially zero, means producing a signal representing a commanded craft pitch rate that is substantially constant and greater than zero, servo means, and means connecting said zero pitch rate signal to said servo means below a predetermined altitude and responsive at said predetermined altitude to connect said other pitch rate signal to said servo means, said servo means being connected to the thrust deflector and elevators of the craft to vary the craft pitch in accordance with the servo means input signals.

4. Apparatus for controlling the pitch of a vertical take-off and landing aircraft during a take-off maneuver, said craft being of the type which takes off and lands with its longitudinal axis perpendicular to the earth, comprising means providing said craft with a substantially constant rate of climb, a gyroscope, the spin axis of which is maintained in a substantially vertical relationship with the earth below a predetermined altitude, pick-off means operable with said gyroscope producing a signal representing the craft pitch relative to the spin axis of the gyroscope, servo means operable with the thrust deflector and elevators of said craft connected to receive said pick-off means output signal and operate the thrust deflector and ailerons so as to keep the longitudinal axis of the craft in substantial alignment with the gyroscope spin axis, and means responsive above a predetermined altitude to precess the gyroscope about an axis parallel to the craft pitch axis until normal flight is attained.

5. Apparatus for controlling the pitch attitude from take-off to normal flight of a vertical take-off and landing aircraft, said craft being of the type which lands and takes off with its longitudinal axis substantially perpendicular to the earth, comprising means maintaining the craft rate of climb substantially constant, means establishing a pitch attitude reference, said reference representing a craft pitch attitude which is substantially perpendicular to the earth below a predetermined altitude, but which gradually changes to a substantially horizontal relationship with the earth above said predetermined altitude, means operable with said last-mentioned means to produce a signal representing the craft pitch relative to the pitch attitude reference, and servo means operable with the thrust deflector and elevators of said craft receiving said signal to operate the thrust deflector and elevators to cancel said servo means input signal.

6. Apparatus for controlling the pitch attitude of a vertical take-off and landing aircraft during take-off, said craft being of the type which lands and takes off with its longitudinal axis substantially perpendicular to the earth, comprising means providing said craft with a constant rate of climb, a gyroscope having its spin axis in substantially vertical relationship with the earth below a predetermined altitude, means for precessing said spin axis in pitch, means responsive at a predetermined altitude to connect said precession means to said gyroscope to precess said gyroscope spin axis, means connected to said gyroscope producing a signal representing the relative pitch attitude between the craft and gyroscope spin axis, means producing a signal representing the craft acceleration about the craft pitch axis, means receiving and summing both said signals, and servo means receiving said sum signal operable with the elevators and thrust deflector of said craft to cancel said relative pitch attitude signal.

7. Apparatus for controlling the flight of a vertical take-off and landing aircraft from take-off, said craft being of the type which takes off and lands with its longitudinal axis in vertical relationship with the earth, comprising means for controlling the throttle of said craft so as to provide said craft with a constant climb rate, means providing a signal representing a zero commanded craft pitch rate and a commanded craft pitch rate greater than zero, means producing a pitch signal representative of the position of the craft control stick, servo means controlling the thrust deflector and elevators of said craft to effect the pitch rate represented by signals applied to said servo means, means responsive below a predetermined altitude to apply said zero pitch rate signal to said servo means and responsive above said altitude to apply said other pitch rate signal to said servo means, and means responsive when said craft longitudinal axis is substantially horizontal to the earth to disable said throttle control means, remove said commanded pitch rate signals from said servo means and apply the signals from said control stick signal producing means to said servo means.

8. Apparatus for controlling the flight of a vertical take-off and landing aircraft from take-off, said craft being of the type which takes off and lands with its longitudinal axis perpendicular to the ground, comprising means producing a signal representing a predetermined rate of climb, means producing a signal representing the actual craft climb rate, means comparing both said signals to produce a climb rate error signal, servo means receiving said error signal and controlling the throttle of said craft accordingly, a gyroscope, the spin axis of which is perpendicular to the earth below a predetermined altitude, means connected to said gyroscope for precessing the spin axis of said gyroscope in proportion to signals applied thereto, pick-off means operable with said gyroscope to produce signals representing the relative pitch attitude between the craft longitudinal axis and the gyroscope spin axis, servo means coupled to receive said pick-off means signal and operate the craft elevators and thrust deflector to cancel the difference in pitch between the craft longitudinal axis and the gyro spin axis, means producing a signal representing the position of the craft control stick, means producing a signal representing the speed of the craft, means receiving said control stick signal and said speed signal and producing a signal representing their quotient, means producing a precession signal, means responsive at said predetermined altitude to apply said precession signal to said precession means, and means responsive when said longitudinal axis is substantially parallel to the earth to disengage said throttle servo, remove said precession signal from said precession means, and apply said quotient signal to said precession means.

9. Apparatus for controlling the flight of a vertical take-off and landing aircraft from take-off, said craft being of the type which takes off and lands with its longitudinal axis perpendicular to the ground, comprising means producing a signal representing a predetermined rate of climb, means producing a signal representing the actual craft climb rate, means comparing both said signals to produce a climb rate error signal, servo means receiving said error signal and controlling the throttle of said craft accordingly, a gyroscope, the spin axis of which is perpendicular to the earth below a predetermined altitude, means connected to said gyroscope for precessing the spin axis of said gyroscope in proportion to signals applied thereto, pick-off means operable with said gyroscope to produce signals representing the relative pitch attitude between the craft longitudinal axis and the gyroscope spin axis, summing means receiving said pick-off means output signal, servo means coupled to receive said summing means output signal, said servo means operating the craft elevators and thrust deflector to cancel through aerodynamic feedback the servo input signal, means producing a signal representing the position of the craft control stick, means producing a signal representing the speed of the craft, means receiving said control stick signal and said speed signal producing a signal representing their quotient, said control stick signal also applied to said summing means, means producing a precession signal, means responsive at said predetermined altitude to apply said precission signal to said precession means, and means responive when said longitudinal axis is substantially parallel to the earth to disengage said throttle servo, remove said precession signal from said precession means, and apply said quotient signal to said precession means.

10. Apparatus for controlling the pitch attitude from take-off to normal flight of a vertical take-off and landing aircraft, said craft being of the type which lands and takes off with its longitudinal axis substantially perpendicular to the earth, comprising means maintaining the craft rate of climp substantially constant, means establishing a pitch attitude reference, said reference representing a craft pitch attitude which is substantially perpendicular to the earth below a predetermined altitude, but which gradually changes to a substantially horizontal relationship with the earth above said predetermined altitude, means operable with said last-mentioned means to produce a signal representing the craft pitch relative to the pitch attitude reference, first servo means operable with the thrust deflector of said craft, second servo means operable with the elevators of said craft, and means responsive to the air speed of the craft to decrease the gain of said first servo means in proportion to said air speed, said first and second servo means both receiving said relative pitch attitude reference signal to respectively operate the thrust deflector and elevators to cancel said said servo means input signals.

11. Apparatus for controlling the flight of a vertical take-off and landing aircraft from take-off, said craft being of the type which takes off and lands with its longitudinal axis in vertical relationship with the earth, comprising means for controlling the throttle of said craft so as to provide said craft with a constant climb rate, means providing a signal representing a zero commanded craft pitch rate and a commanded craft pitch rate greater than zero, means producing a pitch signal representative of the position of the craft control stick, first servo means operable with the thrust deflector of said craft, second servo means operable with the elevators of said craft, and means connected to said control stick responsive to a predetermined force on said control stick to increase the gain of said first servo means, said first and second servo means controlling respectively the thrust deflector and elevators of said craft to effect the pitch rate represented by signals applied to said servo means, means responsive below a predetermined altitude to apply said zero pitch rate signal to both said servo means and responsive above said altitude to apply said other pitch rate signal to said servo means, and means responsive when said craft longitudinal axis is substantially horizontal to the earth to disable said throttle control means, remove said commanded pitch rate signals from both said servo means, and apply the signals from the control stick signal producing means to both said servo means.

12. Apparatus for controlling the flight of a vertical take-off and landing aircraft from take-off, said craft being of the type which takes off and lands with its longitudinal axis perpendicular to the ground, comprising means producing a signal representing a predetermined rate of climb, means producing a signal representing the actual craft climb rate, means comparing both said signals to produce a climb rate error signal, servo means receiving said error signal and controlling the throttle of said craft accordingly, a gyroscope, the spin axis of which is perpendicular to the earth below a predetermined altitude, means connected to said gyroscope for precessing the spin axis of said gyroscope in proportion to signals applied thereto, pick-off means operable with said gyroscope to produce signals representing the relative pitch attitude between the craft longitudinal axis and the gyroscope spin axis, a lever, first and second shaft means each pivotally connected to said lever in spaced apart relationship, means responsive to said pick-off means output signal to move said first shaft means orthogonally to said lever, means producing a signal representing the position of the craft control stick, means responsive to said control stick signal to move said second shaft means orthogonally to said lever, output shaft means pivotally connected to the lever between the first and second shaft means, servo means responsive to the position of said output shaft means to cancel the difference in pitch between the craft longitudinal axis and the gyro spin axis, means producing a signal representing the craft speed, means receiving said control stick signal and said speed signal producing a signal representing their quotient, means producing a precession signal, means responsive at said predetermined altitude to apply said precession signal to said precession means, and means responsive when said longitudinal axis is substantially parallel to the earth to disengage said throttle servo, remove said precession signal from said precession means, and apply said quotient signal to said precession means.

13. Apparatus for controlling the pitch of a vertical take-off and landing aircraft during the take-off maneuver, said craft being of the type which takes off and lands in substantially perpendicular relationship with the earth, comprising means commanding a predetermined rate of climb, means producing a signal representing a commanded craft pitch rate that is substantially zero, means producing a signal representing a commanded craft pitch rate that is substantially constant and greater than zero, servo means, and means connecting said zero pitch rate signal to said servo means below said commanded rate of climb and responsive at said commanded rate of climb to connect said other pitch rate signal to said servo means, said servo means being connected to the thrust deflector and elevators of the craft to vary the craft pitch in accordance with the servo means input signals.

14. Apparatus for controlling the pitch attitude of a vertical take-off and landing aircraft during take-off, said craft being of the type which lands and takes off with its longitudinal axis substantially perpendicular to the earth, comprising means commanding a constant rate of climb, a gyroscope having its spin axis in substantially vertical relationship with the earth when the craft climb rate is below a predetermined value, means for precessing said spin axis in pitch, means responsive at said commanded rate of climb to connect said precession means to said gyroscope to precess said gyroscope spin axis, means connected to said gyroscope producing a signal representing the relative pitch attitude between the craft and gyroscope spin axis, means producing a signal representing the craft acceleration about the craft pitch axis, means receiving and summing both said signals, and servo means receiving said sum signal operable with the elevators and thrust deflector of said craft to cancel said relative pitch attitude signal.

15. Apparatus for controlling the flight of a vertical take-off and landing aircraft from take-off, said craft being of the type which takes off and lands with its longitudinal axis perpendicular to the ground, comprising means producing a signal representing a predetermined rate of climb, means producing a signal representing the actual craft climb rate, means comparing both said signals to produce a climb rate error signal, servo means receiving said error signal and controlling the throttle of said craft accordingly, a gyroscope, the spin axis of which is perpendicular to the earth during a first portion of the take-off maneuver, means connected to said gyroscope for precessing the spin axis of said gyroscope in proportion to signals applied thereto, pick-off means operable with said gyroscope to produce signals representing the relative pitch attitude between the craft longitudinal axis and the gyroscope spin axis, a lever, first and second shaft means each pivotally connected to said lever in spaced apart relationship, means responsive to said pick-off means output signal to move said first shaft means orthogonally to said lever, means producing a signal representing the position of the craft control stick, means responsive to said control stick signal to move said second shaft means orthogonally to said lever, output shaft means pivotally connected to the lever between the first and second shaft means, servo means responsive to the position of said output shaft means to cancel the difference in pitch between the craft longitudinal axis and the gyro spin axis, means producing a signal representing the craft speed, means receiving said control stick signal and said speed signal producing a signal representing their quotient, means producing a precession signal, means responsive during a second portion of the take-off maneuver to apply said precession signal to said precession means, and means responsive when said longitudinal axis is substantially parallel to the earth to disengage said throttle servo, remove said precession signal from said precession means, and apply said quotient signal to said precession means.

16. Apparatus for use in controlling the pitch attitude of a vertical take-off and landing aircraft during take-off, said craft being of the type which takes off and lands with its longitudinal axis substantially perpendicular to the earth comprising means providing the craft with a substantially constant rate of climb, means providing signals representing a commanded craft pitch rate that is substantially zero and a commanded craft pitch rate that is greater than zero, and servo means responsive during a first portion of the take-off maneuver to said zero pitch rate signals and responsive during a second portion of the take-off maneuver to said other pitch rate signals, said servo means operating to deflect the craft elevators and vary the direction of thrust to change the craft pitch attitude.

17. The apparatus of claim 16 including means producing a signal representing the position of the craft control stick, means producing a signal representing the speed of the craft, means receiving said control stick signal and said speed signal producing a signal representing their quotient, said quotient signal being also applied to said servo means, and means responsive to disable said means providing said craft with a substantially constant rate of climb and remove the commanded pitch rate signals from said servo means when the longitudinal axis of said craft becomes substantially horizontal.

References Cited in the file of this patent
UNITED STATES PATENTS

| | | |
|---|---|---|
| 2,821,349 | Sohn | Jan. 28, 1958 |
| 2,930,549 | Ernst | Mar. 29, 1960 |
| 2,945,649 | Metcalf et al. | July 19, 1960 |
| 2,950,075 | Owen | Aug. 23, 1960 |